(12) United States Patent
Allen et al.

(10) Patent No.: US 10,341,415 B2
(45) Date of Patent: Jul. 2, 2019

(54) ELECTRONIC INFORMATION TREE-BASED ROUTING

(71) Applicant: Slingshot Technologies, Inc., Atlanta, GA (US)

(72) Inventors: Philip Evan Allen, Decatur, GA (US); Lee Robert Isensee, San Jose, CA (US); Michael Helbling, Marietta, GA (US); Lee Blankenship, Sandy Springs, GA (US); Evan Lapointe, Atlanta, GA (US)

(73) Assignee: Slingshot Technologies, Inc., Atlanta, GA (US)

( * ) Notice: Subject to any disclaimer, the term of this patent is extended or adjusted under 35 U.S.C. 154(b) by 342 days.

(21) Appl. No.: 14/965,205

(22) Filed: Dec. 10, 2015

(65) Prior Publication Data

US 2017/0171291 A1  Jun. 15, 2017

(51) Int. Cl.
*H04L 29/08* (2006.01)
*H04N 21/20* (2011.01)

(52) U.S. Cl.
CPC ............ *H04L 67/06* (2013.01); *H04L 67/02* (2013.01); *H04L 67/1002* (2013.01);
(Continued)

(58) Field of Classification Search
CPC ............ G06F 17/2247; G06F 17/241; G06F 17/30011; G06F 17/30174; G06F 17/30722; G06F 17/30873; G06F 3/0482; G06Q 30/0251; G06Q 30/0277; H04L 67/06; H04L 67/02; H04L 67/1002; H04L 67/1014; H04L 67/1025; H04N 21/20
See application file for complete search history.

(56) References Cited

U.S. PATENT DOCUMENTS 7,339,937 B2  3/2008 Mitra et al.
7,640,171 B2  12/2009 Gendron et al.
(Continued)

OTHER PUBLICATIONS

Dietz, W. et al., "Slipstream: Automatic Interprocess Communication Optimization," Usenix, The Advanced Computer Society, 2015 USENIX Annual Technical Conference (USENIC ATC '15), Jul. 8-10, 2015, Santa Clara, CA, USA, 14 pages.
(Continued)

*Primary Examiner* — Le H Luu
(74) *Attorney, Agent, or Firm* — Nelson Mullins Riley & Scarborough LLP

(57) ABSTRACT

A method, system, and medium related to data retrieval using tags and routing rules to optimize the data retrieved and the response time for the data retrieval by decreasing the latency of the response and by increasing the efficacy of the dynamic content delivery is provided. A message request is received from a client server. A local server determines if the digital content resides on a local server by comparing a tagged rule for the message request with a tagged rule associated with the local server. If the local server determines, by comparing the tagged rules, that the digital content does not reside on the local server, the local server sends the message request for the digital content to a service server. The service server then parses the tagged rule associated with the message request into a set of tree-based hierarchical tagged rules.

17 Claims, 7 Drawing Sheets

(52) U.S. Cl.
CPC ...... *H04L 67/1014* (2013.01); *H04L 67/1025* (2013.01); *H04N 21/20* (2013.01)

(56) References Cited

U.S. PATENT DOCUMENTS

| | | | |
|---|---|---|---|
| 7,685,198 B2* | 3/2010 | Xu | G06F 17/241 |
| | | | 707/748 |
| 7,761,594 B1 | 7/2010 | Mowat | |
| 7,849,269 B2 | 12/2010 | Sundarrajan et al. | |
| 7,987,239 B2 | 7/2011 | Agarwalla et al. | |
| 8,156,066 B2 | 4/2012 | Wang et al. | |
| 8,219,555 B1* | 7/2012 | Mianji | G06F 17/30722 |
| | | | 707/736 |
| 8,271,636 B2 | 9/2012 | L'Heureux et al. | |
| 8,364,720 B2 | 1/2013 | Levy | |
| 9,021,048 B2 | 4/2015 | Luna et al. | |
| 9,055,118 B2 | 6/2015 | Lobo et al. | |
| 2003/0084404 A1* | 5/2003 | Dweck | G06F 17/30722 |
| | | | 715/255 |
| 2007/0028171 A1* | 2/2007 | MacLaurin | G06F 3/0482 |
| | | | 715/705 |
| 2007/0214411 A1* | 9/2007 | Puthiyaveettil | G06F 17/2247 |
| | | | 715/234 |
| 2009/0216735 A1* | 8/2009 | Dexter | G06F 17/30011 |
| 2012/0303561 A1* | 11/2012 | Sathish | G06F 17/30873 |
| | | | 706/14 |
| 2014/0282281 A1* | 9/2014 | Ram | G06Q 30/0251 |
| | | | 715/863 |
| 2015/0039784 A1 | 2/2015 | Westphal | |
| 2015/0170072 A1 | 6/2015 | Grant et al. | |
| 2016/0358230 A1* | 12/2016 | Wilson | G06Q 30/0277 |
| 2017/0249328 A1* | 8/2017 | Liang | G06F 17/30174 |

OTHER PUBLICATIONS

Prodanoff, Z. et al., "Managing routing tables for URL routers in content distribution networks," International Journal of Network Management, vol. 14, pp. 177-192 (2004).

* cited by examiner

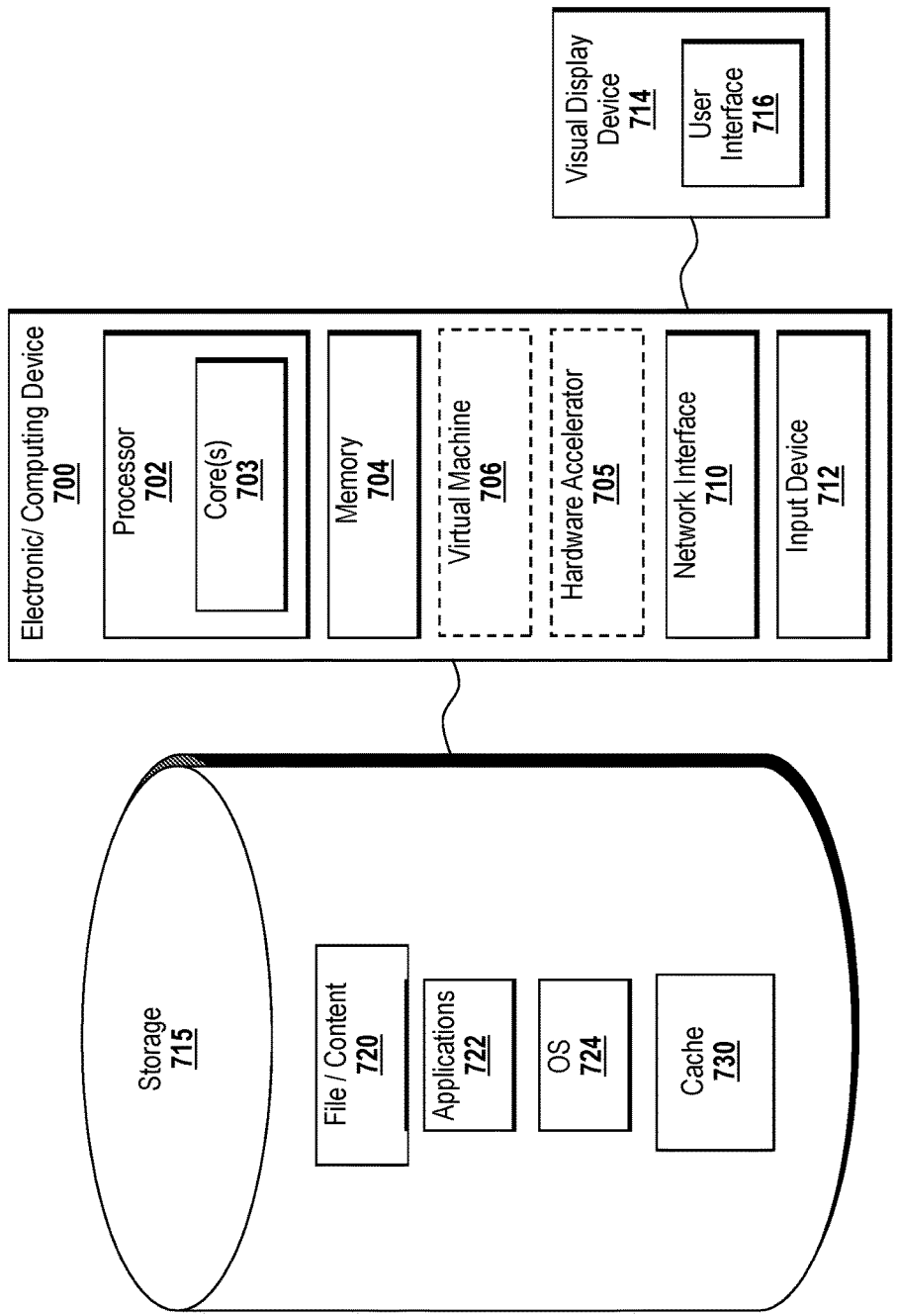

ELECTRONIC INFORMATION TREE-BASED ROUTING

BACKGROUND

1. Technical Field

Example embodiments of the present application relate in general to the field of data transfer over a network, and more particularly to data retrieval using tags and routing rules to optimize the data retrieved and the response time for the data retrieval by decreasing the latency of the response and by increasing the efficacy of the dynamic content delivery.

2. Related Art

The Hypertext Transfer Protocol (HTTP) is an application protocol for distributed, collaborative, hypermedia information systems. As the foundation of data communication for the World Wide Web, the HTTP protocol is designed to improve or enable communications between clients and servers using intermediate network elements, such as proxy servers. The standards development of HTTP was coordinated by the Internet Engineering Task Force (IETF) and the World Wide Web Consortium (W3C) and culminated in the publication of a series of Requests for Comments (RFCs).

Currently, when a user requests information from the Internet, the user typically submits an HTTP request message, using a client server, to a web server. The web server, which typically stores content, returns a response message to the client server in the form of a hypertext markup language (HTML) file, cascading style sheets (CSS), JavaScripts (JS), images, or another relevant data format. The web server may also perform other functions on behalf of the user based on the HTTP request message. The response message from the web server contains the completion status information concerning the HTTP request message and may contain the content requested by the client server in the HTTP message body.

To improve system performance, an intermediate server, e.g. a local or a proxy server, between the requesting client server and the web server may be used to cache responses from the web server and return subsequent requests for the same content directly to the client server. When a message request from the client server is received, the intermediate server checks with the web server to see if a cache entry associated with the content residing in the intermediate server is still valid. By checking with the web server, the intermediate server validates its cache entry associated with the message request.

The use of an entity tag (ETag) is specified as part of the HTTP protocol. The ETag can be used for validation of the cache entry. An ETag is an opaque identifier, typically assigned by a web server, wherein the ETag is unique to the computer generating the ETag. The ETag is assigned to a specific version of a resource found at a uniform resource locator (URL) location. Thus, a different computer generating an ETag for the same version of the same resource does not produce the same ETag. If the resource content at the URL changes, a new and different ETag is assigned for association with that resource content. Used in this manner, ETags can be quickly compared and used to determine if versions of a resource, located on different computers, are the same or are different.

The use of ETags in the HTTP header is optional as defined in version 1.1 of the HTTP specification. See, for example, RFC-2616 section 14, (https://tools.ietf.org/html/rfc2616). In the HTTP, ETags typically are used for comparing two or more entities from the same requested resource content. HTTP version 1.1 uses entity tags in the ETag, If-Match, If-None-Match, and if-Range header fields of the HTTP header. ETags are one mechanism that HTTP provides for cache validation and allow a client server to make conditional requests for files. The use of ETags allows caches to be more efficient by saving bandwidth. By using ETags, the web server is not required to send the full amount of the content requested in a response if the requested content has not changed since the last time the content was transmitted to the client server.

Typically, the web server assigns an ETag to the requested file and returns the file along with the corresponding ETag value to the requesting server. The ETag value may be placed in the HTTP ETag header field. The requesting client server or intermediate server may then cache the file along with the corresponding ETag. When a client server requests the same file as before, the client server may send a message request for the content and also the ETag associated with the requested content. The ETag from the client server is typically placed in the If-None-Match HTTP header field. On this subsequent request for information, the intermediate server and/or web server may compare the received client server's ETag with the ETag associated with the current version of the file residing on the intermediate and/or web server. If the ETag values match, i.e. the content of the file has not changed, the intermediate server and/or web server may send back a very short response with an HTTP "not modified" status message instead of returning the file in a response. The status message tells the client server that a local or cached version of the file is current and can be used. This method of communication saves bandwidth that would otherwise be required by sending the file from the web server to the client server.

ETags, however, are unique to a file and to the server which generated the file. If the ETags associated with the requested file do not match and/or if the server cannot locate the requested digital content, an HTTP 'not found' message is returned to the client server. Locating content related to the file using ETags on another server is problematic in that the ETag is unique to the file and to the computer generating the ETag.

Thus, another method is required to efficiently locate and provide a requested file and/or content related to the requested file across alternate servers. The alternate method for retrieving digital content over the web and/or between servers still needs save the bandwidth that would otherwise be required to send the file and/or content related to the requested file, assuming that the content has been previously transmitted to the client server. The alternate method should also verify that the file and/or content related to the requested file has not changed or is still relevant since the last occurrence of the content request.

SUMMARY OF THE INVENTION

The present application concerns methods, systems, and mediums for providing responses to requests for digital content. With the present application, it may be possible to effectively manage a network and network data, such as Internet resources and Internet based content, with a web based interface using HTTP requests, thereby decreasing the time required to deploy content, increasing the accuracy in targeting information to a user, and increasing the performance of the website or an application.

The request for digital content may come from a desktop, laptop, mobile, or other network connected device, application, or services, such as a web browser, application, and/or utility or service. With each request, a plurality of characteristics can be used to uniquely identify the content being requested as well as what source device is doing the requesting. These characteristics are used to determine the appropriate response to the file request by navigating a tree structure of rules resulting in the return of an electronic file, content related to the file, another link redirecting the user, and/or a message response indicating blank contents. The message response with blank contents indicates to the client server that the file or content related to the file could not be found.

The method, system, and medium for providing digital content may include receiving a user request or a device request for digital content, such as a file, from one or more user devices, from one or more client servers, or from one or more intermediate or local servers. The one or more user devices may comprise a mobile device, a telecommunication device, a computing device, or another type of hardware device.

In an exemplary embodiment, the present application is related to a method of retrieving digital content using one or more electronic devices. The method comprises receiving, at a first electronic device, for example, an intermediate server, a proxy server, or a local server, a message request for digital content from a user requesting device, for example, a client server. The first electronic device determines one or more tagged rules associated with the message request and retrieves one or more tagged rules associated with the first electronic device. The first electronic device then compares the tagged rule associated with the message request to the tagged rule associated with the first electronic device. The first electronic device sends a response associated with the digital content if the tagged rule associated with the message request and the tagged rule associated with the first electronic device are equivalent.

The method may further comprise sending the message request for the digital content to a second electronic device, for example, a service server, a web server, or another intermediate server, if the tagged rule associated with the message request and the tagged rule associated with the first electronic device are not equivalent. The second electronic device parses the tagged rules associated with the message request into a set of tree-based hierarchical tagged rules. The second electronic device retrieves one or more tagged rules associated with the second electronic device and then compares the parsed tagged rules to the tagged rule associated with the second electronic device. The second electronic device sends the response associated with the digital content to the user requesting device.

In some embodiments of the method of the present application, the digital content requested may comprise at least one of electronic audio media, video media, image media, textual content, and program interfaces. In one embodiment, the tagged rules associated with the message request comprise routing rules defined by at least one of a person, a process, an electronic storage system, a date, a time, a frequency of the message request, a session based or persistent user unique identifier, and/or the destination device such as a client server.

In one embodiment, hash values may be used to determine if the tagged rules are equivalent. The hash value is a value returned by one or more hash functions associated with the one or more tagged rules. A hash value result for the tagged rule associated with the message request is compared to a hash value result for the tagged rule associated with the first electronic device to determine if the tagged rules are equivalent.

In one embodiment, a response sent from the electronic devices may comprise a content found indicator, the digital content identified by the message request, content related to the digital content identified by the message request, or a blank content message, wherein the blank content message is returned if none of the parsed tagged rules are equivalent to the tagged rule associated with the second electronic device.

In one embodiment, the response to the user requesting device may include content related to the digital content identified by the message request, for example another file or a link to a website indicating where the requested file, or content related to the requested file, may be located. In some embodiments, a monitor log or a message log may be updated when data is sent between electronic devices.

In some embodiments of the method of the present application, a separate response is sent from the second electronic device to the user requesting device for each parsed tagged rule. In one embodiment, the digital content may be retrieved from an external file store accessible by the second electronic device if the digital content does not to reside on either of the electronic devices. In another embodiment, the response sent to the client server may be sent via a slip-stream insertion. Slip-stream, in this case, comprises delivering either the entire digital contents of the resulting rule matching or smaller portions of the digital contents, which match the one or more resulting rules, so that the combined content would be comprised of the entire digital content upon completion of the delivery.

In another exemplary embodiment, the present application is related to a system for retrieving digital content. The system comprises a first electronic device, such as an intermediate server, a proxy server, or a local server, configured to receive a message request for the digital content from a user requesting device, such as a client server. The first electronic device determines one or more tagged rules associated with the message request. The first electronic device retrieves one or more tagged rules associated with the first electronic device and compares the tagged rule associated with the message request to the tagged rule associated with the first electronic device. The first electronic device sends a response associated with the digital content to the user requesting device if the tagged rule associated with the message request and the tagged rule associated with the first electronic device are equivalent.

The system may further comprise a second electronic device, for example a service server or web server, configured to receive the message request for the digital content from the first electronic device if the tagged rule associated with the message request and the tagged rule associated with the first electronic device are not equivalent. The second electronic device parses the tagged rules associated with the message request into a set of tree-based hierarchical tagged rules. The second electronic device retrieves one or more tagged rules associated with the second electronic device and compares the parsed tagged rules to the tagged rule associated with the second electronic device. The second electronic device then sends a response associated with the digital content to the user requesting device.

In some embodiments of the system for the present application, the digital content requested may comprise at least one of electronic audio media, video media, image media, textual content, and program interfaces. In one embodiment, the tagged rules associated with the message request comprise routing rules defined by at least one of a person, a process, an electronic storage system, a date, a time, a frequency of the message request, a session based or persistent user unique identifier, and the first server.

In one embodiment, hash values may be used to determine if the tagged rules are equivalent. The hash value is a value returned by one or more hash functions associated with the one or more tagged rules. A hash value result for the tagged rule associated with the message request is compared to a hash value result for the tagged rule associated with the first electronic device to determine if the tagged rules are equivalent.

In one embodiment, a response sent from the electronic devices may comprise a content found indicator, the digital content identified by the message request, content related to the digital content identified by the message request, or a blank content message, wherein the blank content message is returned if none of the parsed tagged rules are equivalent to the tagged rule associated with the second electronic device.

In one embodiment, the response to the user requesting device may include content related to the digital content identified by the message request, for example another file or a link to a website indicating where the requested file, or content related to the requested file, may be located. In some embodiments, a monitor log or message log may be updated when data is sent between servers.

In some embodiments of the system of the present application, a separate response is sent from the second electronic device to the user requesting device for each parsed tagged rule. In one embodiment, the digital content may be retrieved from an external file store accessible by the second electronic device if the digital content does not to reside on either of the electronic devices. In another embodiment, the response sent to the client server may be sent via a slip-stream insertion. Slip-stream, in this case, comprises delivering either the entire digital contents of the resulting rule matching or smaller portions of the digital contents, which match the one or more resulting rules, so that the combined content would be comprised of the entire digital content upon completion of the delivery.

In another exemplary embodiment, the present application is related to a non-transitory computer-readable storage medium storing computer-executable instructions for retrieving digital content. When the computer-executable instructions are executed on a first computing device, the first computing device, such as an electronic device, an intermediate server, a proxy server, or a local server, receives a message request for the digital content from a user requesting device such as a client server or user device. The first computing device determines one or more tagged rules associated with the message request. The first computing device retrieves one or more tagged rules associated with the first computing device and compares the tagged rule associated with the message request to the tagged rule associated with the first computing device. The first computing device sends a response associated with the digital content if the tagged rule associated with the message request and the tagged rule associated with the first computing device are equivalent.

The non-transitory computer-readable storage medium storing computer-executable instructions may further comprise a second computing device, for example a service server or web server. When the computer-executable instructions are executed on a second computing device, the second computing device receives the message request for the digital content from the first computing device if the tagged rule associated with the message request and the tagged rule associated with the first computing device are not equivalent. The second computing device parses the tagged rules associated with the message request into a set of tree-based hierarchical tagged rules. The second computing device retrieves one or more tagged rules associated with the second computing device and compares the parsed tagged rules to the tagged rule associated with the second computing device. The second computing device sends a response associated with the digital content.

In some embodiments of the non-transitory computer-readable storage medium storing computer-executable instruction for the present application, the digital content requested may comprise at least one of electronic audio media, video media, image media, textual content, and program interfaces. In one embodiment, the tagged rules associated with the message request comprise routing rules defined by at least one of a person, a process, an electronic storage system, a date, a time, a frequency of the message request, a session based or persistent user unique identifier, and the first server.

In one embodiment, hash values may be used to determine if the tagged rules are equivalent. The hash value is a value returned by one or more hash functions associated with the one or more tagged rules. A hash value result for the tagged rule associated with the message request is compared to a hash value result for the tagged rule associated with the first electronic device to determine if the tagged rules are equivalent.

In one embodiment, a response sent from the computing devices may comprise a content found indicator, the digital content identified by the message request, content related to the digital content identified by the message request, or a blank content message, wherein the blank content message is returned if none of the parsed tagged rules are equivalent to the tagged rule associated with the second computing device.

In one embodiment, the response to the user requesting device may include content related to the digital content identified by the message request, for example another file or a link to a website indicating where the requested file, or content related to the requested file, may be located. In some embodiments, a monitor log or message log may be updated when data is sent between servers.

In some embodiments of the non-transitory computer-readable storage medium storing computer-executable instruction of the present application, a separate response is sent from the second computing device to the user requesting device for each parsed tagged rule. In one embodiment, the digital content may be retrieved from an external file store accessible by the second computing device if the digital content does not to reside on either of the computing devices. In another embodiment, the response sent to the user requesting device may be sent via a slip-stream insertion. Slip-stream, in this case, comprises delivering either the entire digital contents of the resulting rule matching or smaller portions of the digital contents, which match the one or more resulting rules, so that the combined content would be comprised of the entire digital content upon completion of the delivery.

Although exemplary embodiments may be described herein with reference to particular software and hardware implementations, it is understood that the present application is not limited to the embodiments disclosed herein.

BRIEF DESCRIPTION OF THE DRAWINGS

The aforementioned features and advantages, and other features and aspects of the present application, will become better understood with regard to the following description and accompanying drawings, wherein:

FIG. 7 depicts an example computing device, for example a server, suitable for use with example embodiments described herein.

DETAILED DESCRIPTION

Figure 1:
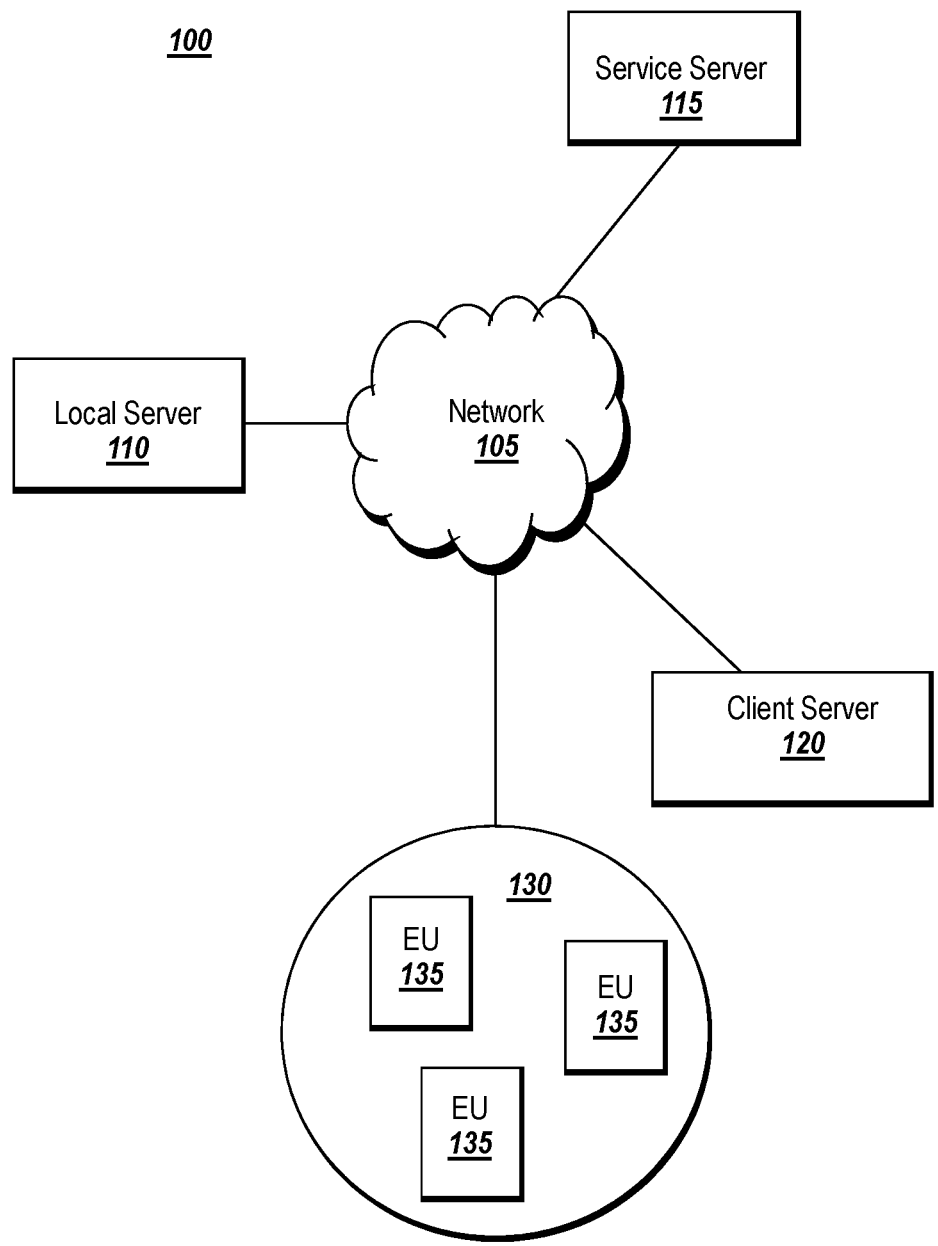
FIG. 1 depicts an example network implementation suitable for use with example embodiments described herein.

Certain embodiments of the present application are described below. It is, however, expressly noted that the present application is not limited to these embodiments, but rather the intention is that additions and modifications to what is expressly described herein also are included within the scope of the invention. Specific structural and functional details disclosed herein are merely representative for purposes of describing example embodiments of the present invention.

Moreover, it is to be understood that the features of the various embodiments described herein are not mutually exclusive and can exist in various combinations and permutations, even if such combinations or permutations are not made express herein, without departing from the spirit and scope of the invention. Example embodiments of the present invention may be embodied in many alternate forms and should not be construed as limited to example embodiments of the present invention set forth herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments described herein relate to data transfer over a computer network, such as the Internet, and more particularly to data retrieval using tags and routing rules, e.g. tagged rules, to optimize the data retrieved and the response time for the data retrieval by decreasing the latency of the response and by increasing the efficacy of the dynamic content delivery. In some embodiments, multiple layer electronic services and storage systems, e.g. a "service", respond to one or more requests by electronic services, electronic storage systems, or electronic processes, e.g. a "recipient". The electronic information may comprise electronic audio media, video media, image media, textual content, and electronic program interfaces. The appropriate electronic information is provided according to one or more routing rules as defined by one or more persons, processes, electronic services, a destination device, or electronic storage systems, or based on a date, a time, a session based or persistent user unique identifier, a frequency of the message request, etc. The originator of the routing rules is the "rule creator".

The one or more routing rules provide a hierarchical structure to determine the appropriate electronic information response to a message request from a user or client server. The returned electronic information is made available to one or more recipients using the routing rules, as well as the consistency of requests from one or more recipients. In one embodiment, hierarchical tree-based routing rules are used and as a result, more than one response containing the requested file, content related to the requested file, and/or alternate links related to the requested file may be returned for a message request.

In an exemplary embodiment, one or more values, for example a value result from a hash function or an associative memory comparison, comprising information about the content requested and the routing rules associated with electronic device and/or network, are used to optimize both a service server and a client server's performance. The performance is optimized in both request latency and total network bandwidth consumption by not having to rerun the tree based rule structure each time the digital content is requested when the information about the content requested and the routing rules associated with electronic device and/or network match. In the event that the values do not match, a lookup is done on the service server to determine if the expected content has been requested recently by another network connected device. If the expected content has been requested recently by another network connected device, the cached content of the other network connected device is returned instead of processing the tree structured rules in order to locate the expected file content. In the event that content does not exist on a local server and the service server, then the tree structured rules based engine will navigate the hierarchical series of rules so as to respond with the appropriate content, a redirection destination, or a message to indicate that no content was found. The response is delivered to the network connected device as if the original link was referencing a file or service on the original site, without any dependency on third-party plug-ins or custom software.

In one embodiment, electronic information stored on a first storage medium, for example, an intermediate or local server, or referenced to on a second storage medium, for example, a web server or service server, is identified based upon one or more routing rules for transmission or disbursement and the electronic information is routed accordingly to the destination recipient. Upon delivery of the message response, a textual or binary definition, for example a tag, of the request is assigned to the electronic information on the recipient's storage services. The resulting tag is made available to the recipient and service. The recipient and the service determine whether existing routing rules may be utilized again or whether, upon the electronic information request, the rules defined by the rule creator should be processed again for different routing and response to the recipient. The appropriate response is determined based on multiple factors including, for example, the date, time, requestor device information, a session based or persistent user unique identifier, electronic information maintained on the electronic storage system, as well as the previously requested electronic information. The resulting electronic information is stored in the service's storage system and the recipient's storage system for a duration defined by the rule creator and the electronic information's characteristics. These and other features of the present application will be described in detail below.

FIG. 1 depicts an example network implementation suitable for use with example embodiments described herein. A system 100 may include a network 105, a first electronic device or a first computing device 110, for example a user device, intermediate server, a proxy server, or a local server, a second electronic device or a second computing device such as a service server 115, a user requesting device such as a client server 120, and a cluster 130 of user Execution Units (EUs) 135. The embodiment of FIG. 1 is exemplary, and other embodiments can include more devices, fewer devices, or devices in arrangements that differ from the arrangement of FIG. 1.

The network 105 may transport data from a source to a destination. Embodiments of the network 105 may use other network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the local server 110, the service server 115, etc.). Data may include digital information or analog information. Data may further be packetized and/or non-packetized.

The network 105 may be a hardwired network using wired conductors and/or optical fibers and/or may be a wireless network using free-space optical, radio frequency (RF), and/or acoustic transmission paths. In one implementation, the network 105 may be a substantially open public network, such as the Internet. In another implementation, the network 105 may be a more restricted network, such as a corporate virtual network. The network 105 may include the Internet, i.e. the World Wide Web, intranet, Local Area Network (LAN), Wide Area Network (WAN), Metropolitan Area Network (MAN), wireless network (e.g., using IEEE 502.11), or other type of network the network 105 may use middleware, for example Common Object Request Broker Architecture (CORBA) or Distributed Component Object Model (DCOM). Implementations of networks and/or devices operating on networks described herein are not limited to, for example, any particular data type, protocol, and/or architecture/configuration.

The service server 115 may include a device that makes a service available to another device. For example, the service server 115 may access an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The client server 120 may include a device that submits a message request to the network 105. For example, the client server 120 may be hosted on a device that receives user input, for example a request for a file, resource, or other content, from a user.

The cluster 130 may include one or more Execution Units (EUs) 135, and may perform processing on behalf of the service server 115 and/or another device, such as the local server 110. For example, the cluster 130 may perform parallel processing on an operation received from the service server 115. The cluster 130 may include EUs 135 that reside on a single device or chip or that reside on a number of devices or chips.

The cluster 130 may include processing devices that perform operations on behalf of a device, such as a requesting device or on behalf of a user. An EU 135 may be a microprocessor, field programmable gate array (FPGA), and/or another type of processing device. The EU 135 may include code, such as code for an operating environment. For example, an EU 135 may run a portion of an operating environment that pertains to parallel processing activities. The service server 115 may operate the cluster 130 and may provide interactive optimization capabilities to the client server 120 on a subscription basis (e.g., via a web service).

A hardware EU 135 may include a device (e.g., a hardware resource) that may perform and/or participate in serial or parallel programming activities. For example, a hardware EU 135 may perform and/or participate in parallel programming activities in response to a request and/or a task it has received (e.g., received directly or via a proxy). A hardware EU 135 may perform and/or participate in substantially any type of parallel programming (e.g., task, data, stream processing, etc.) using one or more devices. For example, a hardware EU 135 may include a single processing device that includes multiple cores or a number of processors. A hardware EU 135 may also be a programmable device, such as a field programmable gate array (FPGA), an application specific integrated circuit (ASIC), a digital signal processor (DSP), or other programmable device. Devices used in a hardware EU 135 may be arranged in many different configurations (or topologies), such as a grid, ring, star, or other configuration. A hardware EU 135 may support one or more threads (or processes) when performing processing operations.

A software EU 135 may include a software resource (e.g., a technical computing environment) that may perform and/or participate in one or more serial or parallel programming activities. A software EU 135 may perform and/or participate in one or more serial or parallel programming activities in response to a request, for example a receipt of a message request and/or one or more portions of the program. A software EU 135 may perform and/or participate in different types of serial or parallel programming using one or more hardware units of execution. A software EU 135 may support one or more threads and/or processes when performing processing operations.

Figure 2:
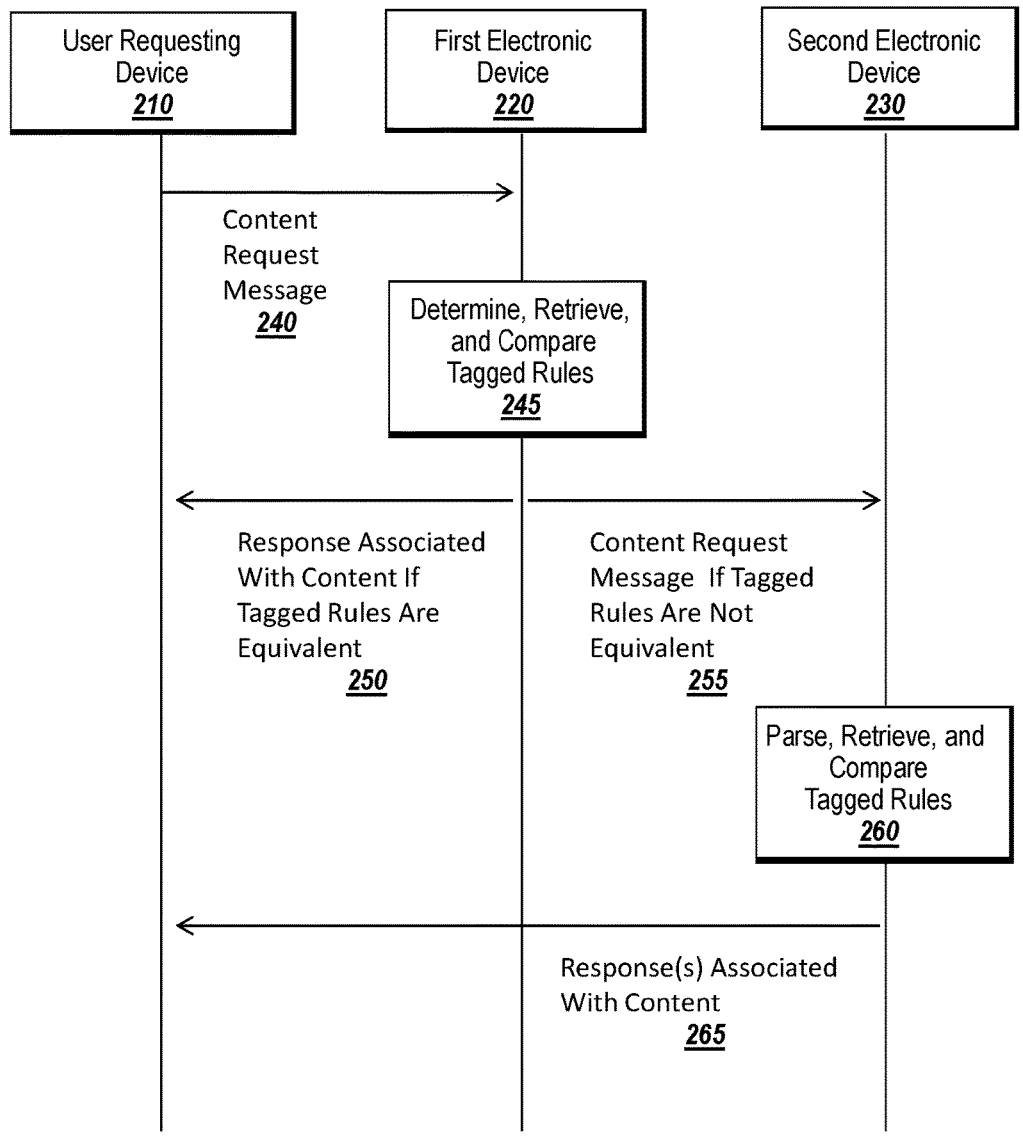
FIG. 2 is a flowchart describing an exemplary message flow for data retrieval with example embodiments described herein.

FIG. 2 is a flowchart describing an exemplary message flow for data retrieval with example embodiments described herein. A user, using a user requesting device 210, such as a client server, requests digital content. The user requesting device 210 generates a content request message 240 associated with the digital content requested by the user. The user requesting device 210 sends the content request message 240 over a network to a first electronic device 220, such as a local server.

The first electronic device 220 determines one or more tagged rules associated with the request message for digital content. The first electronic device 220 retrieves one or more tagged rules associated with the first electronic device. The first electronic device 220 then compares one or more tagged rules associated with the request message for digital content with the one or more tagged rules associated with the first electronic device at step 245.

If the tagged rules are equivalent, the first electronic device 220 sends a response associated with the digital content 250 to the user requesting device 210. If the tagged rules are not equivalent, then the first electronic device 220 sends the request message for digital content 240 to a second electronic device 230 at step 255. The first electronic device 220 may also send the tagged rules determined for the request message for digital content at step 245 to the second electronic device 230 at step 255.

The second electronic device 230 parses the one or more tagged rules associated with the request message for digital content 240 into a set of tree-based hierarchical tagged rules. The second electronic device 230 retrieves one or more tagged rules associated with the second electronic device 230 and then compares the parsed tagged rules with the retrieved tagged rules associated with the second electronic device 230 at step 260. The second electronic device then sends one or more responses associated with the requested content 265 to the user requesting device 210.

FIGS. 3-6 illustrate in detail a method 300 of the present application for providing digital content via a network, such as over Internet links.

Figure 3:
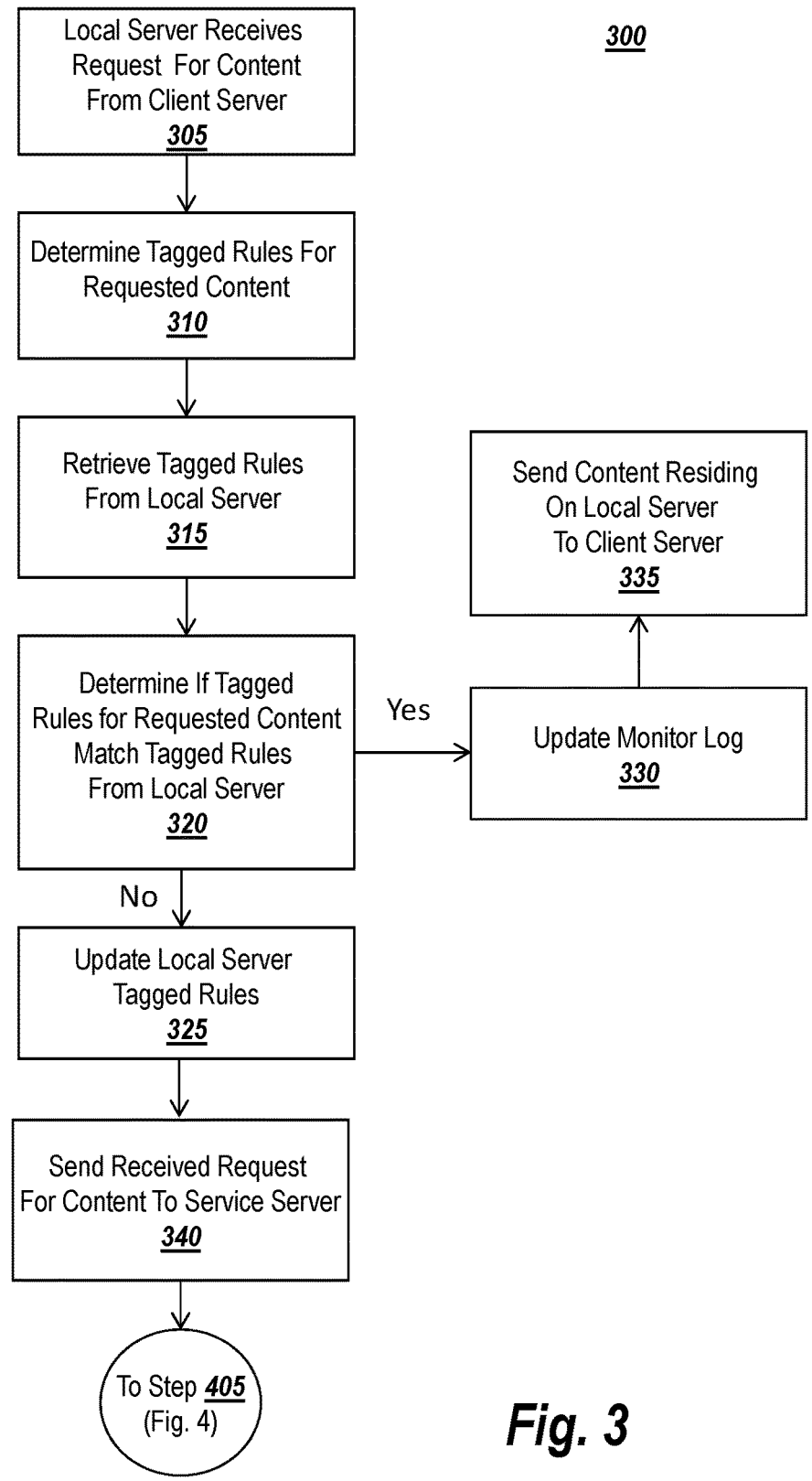
FIG. 3 is a flowchart describing an exemplary procedure for routing rules associated with a first electronic device such as a local server with example embodiments described herein.

In further detail of the method 300, FIG. 3 illustrates a flowchart describing an exemplary procedure for routing rules associated with an electronic device, such as a local server. In the depicted embodiment, a first electronic device, for example, an intermediate or local server receives a message request for a digital content, for example electronic audio media, video media, image media, textual content, and/or electronic program interfaces, from a user requesting device such as a client server, at step 305. The message request may be sent to the local server via a network using a standard HTTP header. The local server receives the message request from the client server via the network. The local server determines routing rules, i.e. the tags or tagged rules, associated with the received message request at step 310.

The tagged rules associated with the received message request are based upon one or more routing rules for transmission or disbursement of the electronic information. The more routing rules for transmission or disbursement of the electronic information may be determined accordingly to the destination for the client server. The tagged rules are defined, for example, by one or more persons, processes, electronic services, or by electronic storage systems associated with the client server. The tagged rules may include an ETag or other delimiting feature associated with the content requested. The tagged rules associated with the message request may also be associated with a date, a time, a session based or persistent user unique identifier, or a frequency of the message request. The tagged rules associated with the received message request 310 may be represented using one or more data mapping functions, such as a hash function.

The one or more data mapping functions, such as hash functions, are used to map the tagged rules associated with the received message request to digital data of fixed size. The one or more values returned by the one or more data mapping functions associated with the message request are stored in a data structure, for example, a hash table.

Tagged rules associated with the first electronic device are retrieved at step 315. The tagged rules associated with the first electronic device are based upon one or more routing rules for transmission or disbursement of the electronic information accordingly to the first electronic device. The tagged rules are defined, for example, by one or more persons, processes, electronic services, or electronic storage systems associated with the first electronic device. The tagged rules may include an ETag or other delimiting features associated with previously requested files. The tagged rules associated with the first electronic device may also be associated with a date, a time, a session based or persistent user unique identifier, or a frequency associated with message requests received from the client server. The tagged rules from the first electronic device may be represented, for example, using one or more data mapping functions. The one or more data mapping functions, such as hash functions, are used to map the tagged rules associated with the first electronic device to digital data of fixed size. The one or more values returned by the one or more data mapping functions associated with the message request are stored in a data structure, for example, a hash table.

The one or more values for associated with the message request and the one or more values associated with the local server stored in the data structure are compared at step 320 to determine if the tagged rules for the requested content match the tagged rules from the first electronic device. If the tagged rules are found to be equivalent, this indicates the tagged rules of the message request are consistent with the tagged rules of the first electronic device and that the file and/or content related to the requested file resides on the first electronic device.

A monitor log is updated at step 330. The monitor log is used, for example, to indicate which files have been transmitted by the first electronic device. The tagged rules associated with the first electronic device are maintained, as the first electronic device had the most recent version of the digital content requested. At step 335, the first electronic device transmits the file and/or content related to the requested file residing on the first electronic device to the client server, completing the message request response.

If the tagged rules at step 320 are found to not be equivalent, the tagged rules associated with the first electronic device are updated at step 325, as the first electronic device did not have the most recent version of the digital content requested. The message request from the client server is then sent from the first electronic device to a second electronic device such as a service server at step 340.

Figure 4:
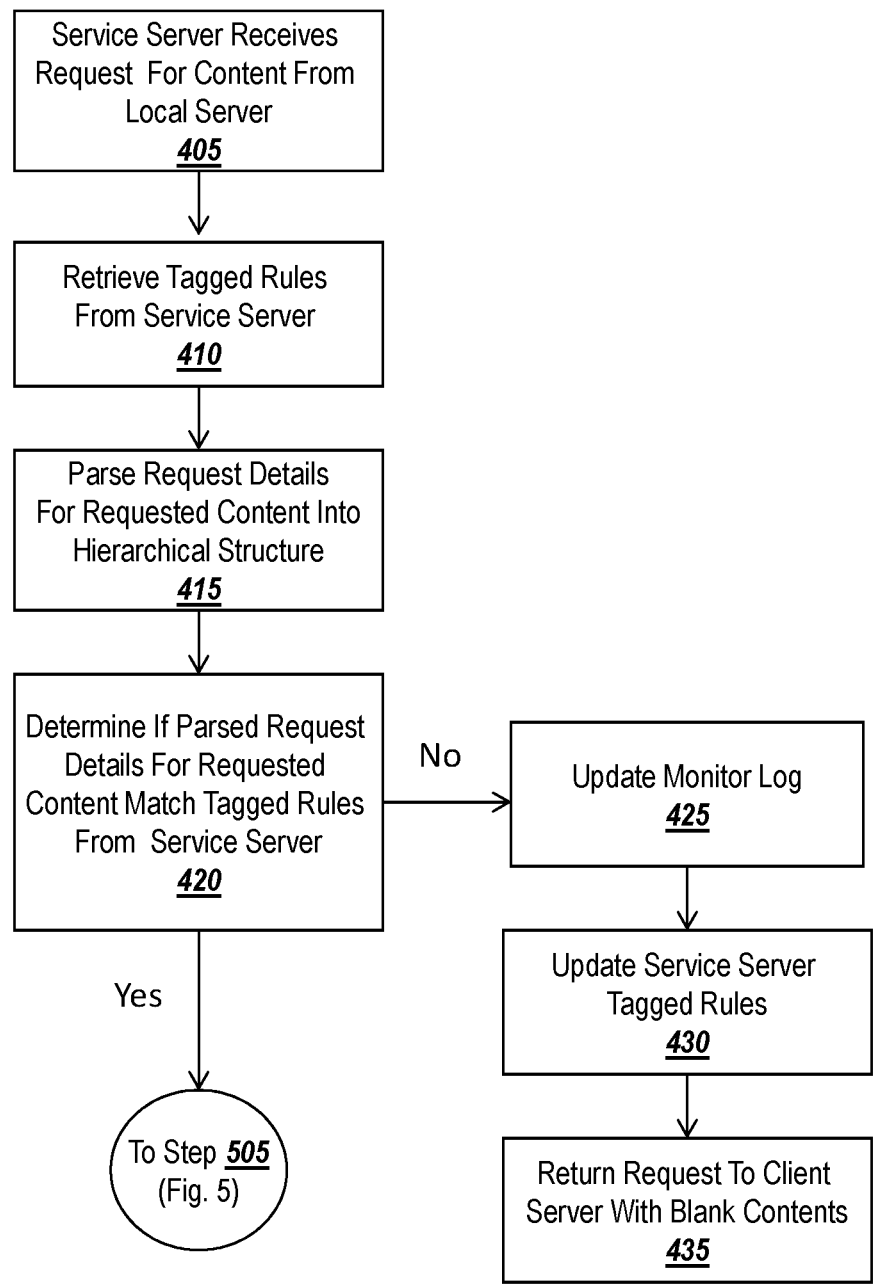
FIG. 4 is a flowchart describing an exemplary procedure for routing rules associated with a second electronic device such as service server with example embodiments described herein.

FIG. 4 is a flowchart describing an exemplary procedure for routing rules associated with a second electronic device, for example, a service server or a web-based server. The second electronic device receives the message request for digital content, originally sent by the client server to the first electronic device, from the first electronic device at step 405. The tagged rules associated with the second electronic device are retrieved at step 410. The tagged rules associated with second electronic device are based upon one or more routing rules for transmission or disbursement of the electronic information accordingly to the second electronic device. The routing rules are defined, for example, by one or more persons, processes, electronic services, or electronic storage systems associated with the second electronic device. The tagged rules associated with the second electronic device may also be associated with a date, a time, a session based or persistent user unique identifier, or a frequency associated with message requests received from the first electronic device. The tagged rules may include an ETag or other delimiting feature associated files generated and/or transmitted by the second electronic device. The tagged rules from the second electronic device are then represented using one or more data mapping functions representative of a hierarchical tree-based routing scheme. The one or more data mapping functions, such as hash functions, are used to map the tagged rules associated with the second electronic device to digital data of fixed size.

The service server parses the tagged rules associated with the message request for the requested content into a hierarchical tree-based structure based on based upon one or more routing rules for transmission or disbursement of the electronic information accordingly to the destination for the client server at step 415. The tagged rules for the message request are defined, for example, by one or more persons, processes, electronic services, or electronic storage systems associated with the client server. The tagged rules associated with the message request may also be associated with a date, a time, a session based or persistent user unique identifier, or a frequency of the message requests received from the client server. The tagged rules may include an ETag or other delimiting feature associated with the file requested. The one or more values returned by the one or more data mapping functions, such as a hash function, associated with the message request are stored in a data structure, for example, a hash table.

The one or more values associated with the parsed message request and the one or more values associated with the second electronic device are compared using the data structure at step 420 to determine if the tagged rules for the requested file match one or more tagged rules associated with the second electronic device.

If none of the values match, indicating the second electronic device does not have the file or any content related to the requested file, the second electronic device updates a monitor log at step 425. The second electronic device updates the second electronic device tagged rules based on the tagged rules associated for the received message request at step 430. The second electronic device then, at step 435, transmits a response to client server indicating no related message content for the message request could be found, completing the message request response.

If one or more values match, i.e. the tagged rules of the message request are consistent with the tagged rules of the service server, the second electronic device determines if the requested file resides in the cache for second electronic device at step 505.

Figure 5:
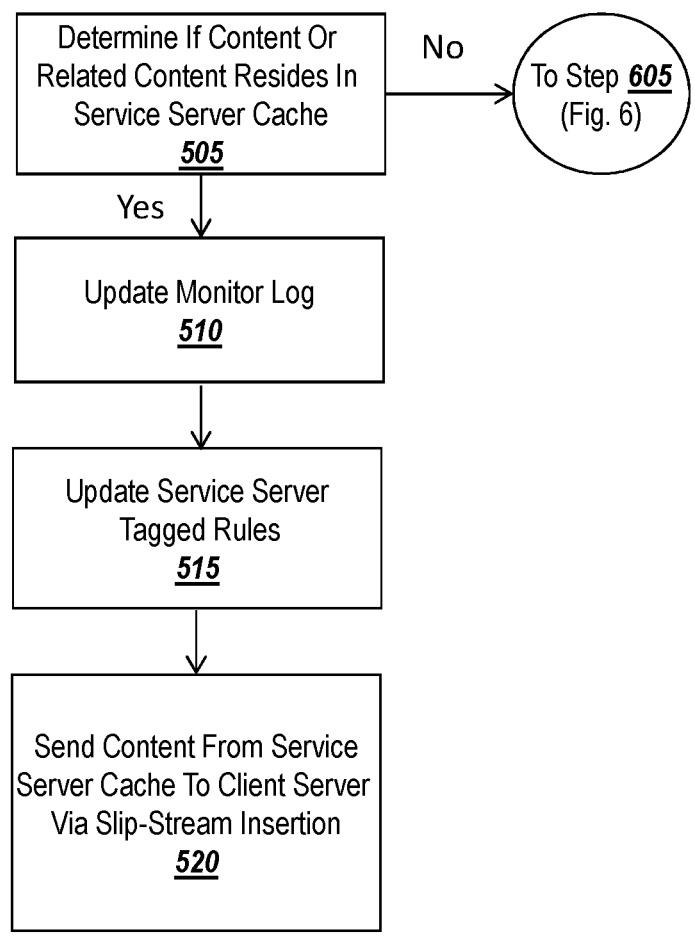
FIG. 5 is a flowchart describing an exemplary procedure for routing rules associated with a service server wherein the requested file resides in the service server cache with example embodiments described herein.

FIG. 5 is a flowchart describing an exemplary procedure for routing rules associated with a second electronic device, such as a service server, wherein the file or related content resides in the cache associated with the second electronic device. At step 505, the second electronic device determines whether the requested file and/or content related to the requested file resides in the cache associated with the second electronic device. If the second electronic device determines that the requested file or content related to requested file resides in the cache associated with the second electronic device, the second electronic device updates a monitor log at step 510. The second electronic device updates the second electronic device tagged rules associated for the received message request at step 515. The second electronic device then transmits a response to client server at step 520, completing the message request response. The service server sends a separate response for each matching value associated with the tagged rules to the client server.

The transmitted response to the client server includes at least one of the following: a content found indicator, the requested file, content related to the requested file, and/or a link to where the requested file or content related to the requested file can be found. The response containing the content found indicator may include a message indicating the file or content related to the file was found and that the file or content related to the file residing on the local server or the client server is still valid. The response may also include the file or content related to requested file if the service server determines the file or content related to the file residing on the local server or client server is not still valid. The response may also be a link to where the requested file or content related to the requested file can be found. The response to the message request can be sent, for example, via a slip-stream insertion to the client server. Slip-stream, in this case, comprises delivering either the entire digital contents of the resulting rule matching or smaller portions of the digital contents, which match the one or more resulting rules, so that the combined content would be comprised of the entire digital content upon completion of the delivery.

If, at step 505, the second electronic device determines that the requested file and/or content related to the requested file does not reside in the cache associated with the second electronic device, the second electronic device then proceeds to step 605 to determine if the requested file and/or content related to the requested file resides in an external store.

Figure 6:
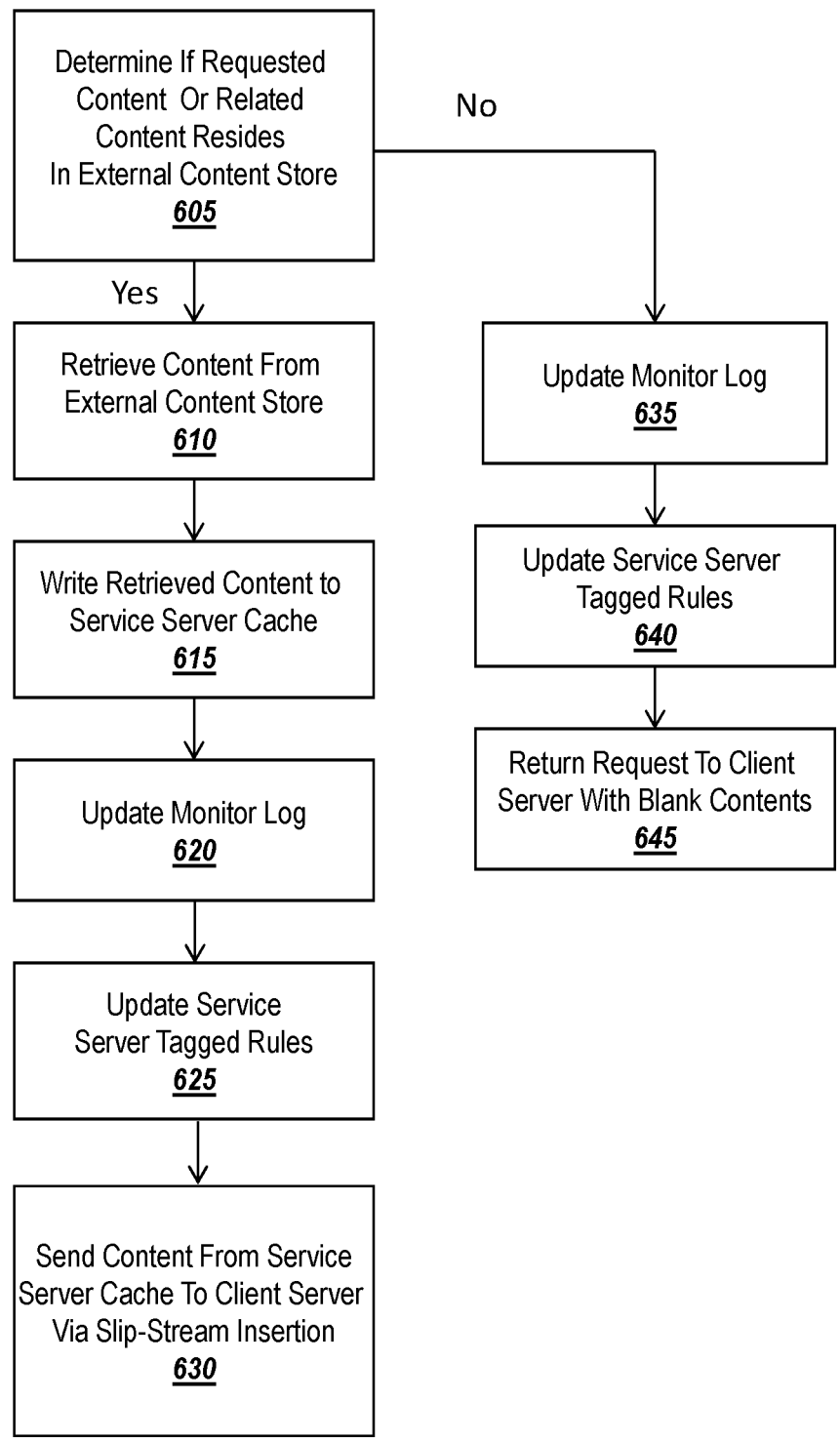
FIG. 6 is a flowchart describing an exemplary procedure for routing rules associated with a service server wherein the requested file resides in an external file store with example embodiments described herein.

FIG. 6 is a flowchart describing an exemplary procedure for routing rules associated with a second electronic device wherein the requested file, or content associated with the requested file, resides in an external file store. At step 605, the second electronic device, such as a service server or a web server, determines if the requested file and/or content related to the requested file resides in an external file store, for example, in external memory, on a hard disk, in another server, in a database, etc., accessible to the second electronic device.

If the second electronic device determines at step 605 that the requested file and/or content related to the requested file does not reside in an external file store accessible to the second electronic device, this is an indication to the second electronic device that the tagged rules for the second electronic device are outdated and need to be updated. The second electronic device updates a monitor log at step 635. The second electronic device updates the second electronic device tagged rules associated with the received message request at step 640 indicating that the second electronic device no longer has access to the requested file or content related to the requested file. The second electronic device then transmits a message response with blank contents to the client server at step 645.

If the second electronic device determines at step 605 that the requested file and/or content related to the requested file do reside in the external file store accessible by the second electronic device, the second electronic device retrieves the requested file and/or content related to the requested file from the external file store at step 610. The second electronic device then writes the retrieved content to the cache associated with the second electronic device at 615. Content is retained in the cache associated with the second electronic device for a specific duration, such as predetermined amount of time, based on the tagged rules associated with the content. Content may also be retained in the cache associated with the second electronic device based on other criteria, such as number of times the file and/or content related to the file is requested, the size of the file, the creation date of the file, etc., or for any other reason defined by the rule creator and/or the characteristics associated with the digital content.

The second electronic device then updates a monitor log at step 620. The second electronic device updates the second electronic device tagged rules associated with the received message request at step 625 to indicate, for example, that the file or content related to the file requested by the message request is now resident in the cache associated with the second electronic device. The second electronic device then transmits a response to client server at step 630, completing the message request response.

The transmitted response to the client server may include at least one of the following: a content found indicator, the requested file, content related to the requested file, and/or a link to where the requested file or content related to the requested file can be found.

The response containing the content found indicator may include a message indicating the file or content related to the file was found but that the file or content related to the file residing on the local server or client server is still valid. If the file residing on the local server or client server is still valid, the service server does not transmit the file or the content related to the file, saving bandwidth.

The response may also include the file or content related to requested file if the service server determines the file or content related to the file residing on the local server or client server is not valid. The response may also be a link to where the requested file or content related to the requested file can be found. The response to the message request can be sent, for example, via a slip-stream insertion to the client server. Slip-stream, in this case, comprises delivering either the entire digital contents of the resulting rule matching or smaller portions of the digital contents, which match the one or more resulting rules, so that the combined content would be comprised of the entire digital content upon completion of the delivery.

Computer-Implemented Embodiments

One or more of the above-described acts may be encoded as computer-executable instructions executable by processing logic. The computer-executable instructions may be stored on one or more non-transitory computer readable media. One or more of the above described acts may be performed in a suitably-programmed electronic device.

FIG. 7 depicts an example of an electronic device and/or computing device 700, for example, an intermediate server, a proxy server, a corporate proxy, a local server, or a user device, suitable for use with one or more embodiments described herein.

The electronic device 700 may take many forms, including but not limited to a computer, workstation, server, network computer, quantum computer, optical computer, Internet appliance, mobile device, a pager, a tablet computer, a smart sensor, application specific processing device, etc.

The electronic device 700 is illustrative and may take other forms. For example, an alternative implementation of the electronic device 700 may have fewer components, more components, or components that are in a configuration that differs from the configuration of FIG. 7. The components of FIG. 7 and/or other figures described herein may be implemented using hardware based logic, software based logic and/or logic that is a combination of hardware and software based logic (e.g., hybrid logic); therefore, the components illustrated in FIG. 7 and/or other figures are not limited to a specific type of logic.

The processor 702 may include hardware based logic or a combination of hardware based logic and software to execute instructions on behalf of the electronic device 700. The processor 702 may include logic that may interpret, execute, and/or otherwise process information contained in, for example, the memory 704. The information may include computer-executable instructions and/or data that may implement one or more embodiments of the invention. The processor 702 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 503. Moreover, the processor 702 may include a system-on-chip (SoC) or system-in-package (SiP). One or more processors 702 may reside in the electronics device 700. An example of a processor 702 is the Intel® Core i7 series of processors available from Intel Corporation, Santa Clara, Calif.

The electronic device 700 may include one or more tangible non-transitory computer-readable storage media for storing one or more computer-executable instructions or software that may implement one or more embodiments of the invention. The non-transitory computer-readable storage media may be, for example, the memory 704 or the storage 715. The memory 704 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 700 may include a virtual machine (VM) 704 for executing the instructions loaded in the memory 704. A virtual machine 706 may be provided to handle a process running on multiple processors so that the process may appear to be using only one computing resource rather than multiple computing resources. Virtualization may be employed in the electronic device 700 so that infrastructure and resources in the electronic device may be shared dynamically. Multiple VMs 706 may be resident on a single computing device 700.

A hardware accelerator 705 may be implemented in an ASIC, FPGA, or some other device. The hardware accelerator 705 may be used to reduce the general processing time of the electronic device 700.

The electronic device 700 may include a network interface 710 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 502.11), high-speed interconnects (e.g., InfiniBand, gigabit Ethernet, Myrinet) or some combination of any or all of the above. The network interface 710 may include a built-in network adapter, network interface card, personal computer memory card international association (PCMCIA) network card, card bus network adapter, wireless network adapter, universal serial bus (USB) network adapter, modem or any other device suitable for interfacing the electronic device 700 to any type of network capable of communication and performing the operations described herein.

The electronic device 700 may include one or more input devices 712, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 700 may include other suitable I/O peripherals.

The input devices 712 may allow a user to provide input that is registered on a visual display device 714. A graphical user interface (GUI) 716 may be shown on the display device 714.

A storage device 715 may also be associated with the computer 700. The storage device 715 may be accessible to the processor 702 via an I/O bus. The information in the storage device 715 may be executed, interpreted, manipulated, and/or otherwise processed by the processor 702. The storage device 715 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 715 may store any modules, outputs, displays, files, content, and/or information 720 provided in example embodiments. The storage device 715 may store applications 722 for use by the computing device 700 or another electronic device. The applications 722 may include programs, modules, or software components that allow the electronic device 700 to perform tasks. Examples of applications include monitor logs, tagged rule creation, hierarchical tree routing, word processing software, shells, Internet browsers, productivity suites, and programming software. The storage device 715 may store additional applications for providing additional functionality, as well as data for use by the computing device 700 or another device. The data may include files, variables, parameters, images, text, and other forms of data.

The storage device 715 may further store an operating system (OS) 724 for running the computing device 700. Examples of OS 724 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 715 may contain cache 730. Cache 730 is a smaller, faster memory which stores copies of the data from frequently used main memory 704 locations. Most electronic devices 700 have different independent caches 730, including instruction and data caches 730, where the data cache 730 is usually organized as a hierarchy of more cache levels, for example L1, L2, etc.

When the electronics device 700 needs to read from or write to a location in main memory 704, it first checks whether a copy of that data is in the cache 730. If so, the electronics device 700 immediately reads from or writes to the cache 730, which is much faster than reading from or writing to main memory 704.

Most modern desktop and server central processing units (CPUs) have several independent caches 730, for example, an instruction cache to speed up executable instruction fetch, a data cache to speed up data fetch and store, and a translation lookaside buffer (TLB) used to speed up virtual-to-physical address translation for both executable instructions and data.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, HyperText Markup Language (HTML), Python, C, C++, C#, GoLang, SystemC, Ruby, Java, JavaScript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

It is understood that the present application may be implemented in a distributed or networked environment. For example, models may be provided and manipulated at a central server, while a user interacts with the models through a user terminal.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

It is intended that the invention not be limited to the particular embodiments disclosed above, but that the invention will include any and all particular embodiments and equivalents falling within the scope of the following appended claims.

What is claimed is:

1. A method for retrieving digital content, the method comprising:
   receiving, at a first electronic device, a message request for the digital content;
   determining a tagged rule associated with the message request;
   retrieving a tagged rule associated with the first electronic device;
   comparing the tagged rule associated with the message request to the tagged rule associated with the first electronic device, wherein the comparing comprises comparing a hash value result for the tagged rule associated with the message request to a hash value result for the tagged rule associated with the first electronic device; and
   sending a response associated with the digital content if the tagged rule associated with the message request and the tagged rule associated with the first electronic device are equivalent.

2. The method of claim 1, wherein the digital content comprises at least one of electronic audio media, video media, image media, textual content, and program interfaces.

3. The method of claim 1, wherein the tagged rule associated with the message request and the tagged rule associated with the first electronic device comprise a routing rule defined by at least one of a person, a process, an electronic storage system, a date, a time, a session based user unique identifier, a persistent user unique identifier, a frequency of the message request, and a destination device.

4. The method of claim 1, wherein the response comprises at least one of a content found indicator, the digital content identified by the message request, and content related to the digital content identified by the message request.

5. The method of claim 4, wherein the content related to the digital content identified by the message request comprises at least one of a file and a link to a website.

6. A method for retrieving digital content, the method comprising:
   receiving, at a first electronic device, a message request for the digital content;
   determining a tagged rule associated with the message request;
   retrieving a tagged rule associated with the first electronic device;
   comparing the tagged rule associated with the message request to the tagged rule associated with the first electronic device wherein the comparing comprises comparing a hash value result for the tagged rule associated with the message request to a hash value result for the tagged rule associated with the first electronic device;
   sending a response associated with the digital content if the tagged rule associated with the message request and the tagged rule associated with the first electronic device are equivalent;
   sending the message request for the digital content to a second electronic device if the tagged rule associated with the message request and the tagged rule associated with the first electronic device are not equivalent;
   parsing the tagged rule associated with the message request into a set of tree-based hierarchical tagged rules;
   retrieving a tagged rule associated with the second electronic device;
   comparing the parsed tagged rules to the tagged rule associated with the second electronic device; and
   sending the response associated with the digital content from the second electronic device.

7. The method of claim 6, wherein the response associated with the digital content from the second electronic device comprises:
   at least one of a content found indicator, the digital content identified by the message request, content related to the digital content identified by the message request, and a blank content message,
   wherein the blank content message is returned if none of the parsed tagged rules are equivalent to the tagged rule associated with the second electronic device.

8. A method of claim 6, wherein a separate response is sent from the second electronic device for each parsed tree-based hierarchical tagged rule.

9. A system for retrieving digital content, the system comprising:
   a first electronic device configured to:
      receive a message request for the digital content;
      determine a tagged rule associated with the message request;
      retrieve a tagged rule associated with the first electronic device;
      compare the tagged rule associated with the message request to the tagged rule associated with the first electronic device, wherein the comparing comprises comparing a hash value result for the tagged rule associated with the message request to a hash value result for the tagged rule associated with the first electronic device; and
      send a response associated with the digital content if the tagged rule associated with the message request and the tagged rule associated with the first electronic device are equivalent.

10. The system of claim 9, wherein the digital content comprises at least one of electronic audio media, video media, image media, textual content, and program interfaces.

11. The system of claim 9, wherein the tagged rule associated with the message request and the tagged rule associated with the first electronic device comprise a routing rule defined by at least one of a person, a process, an electronic storage system, a date, a time, a session based user unique identifier, a persistent user unique identifier, a frequency of the message request, and a destination device.

12. The system of claim 9, wherein the response comprises:
   at least one of a content found indicator, the digital content identified by the message request, and content related to the digital content identified by the message request,
   wherein the content related to the digital content identified by the message request comprises at least one of a file and a link to a website.

13. A system for retrieving digital content, the system comprising:
   a first electronic device configured to:
      receive a message request for the digital content;

determine a tagged rule associated with the message request;

retrieve a tagged rule associated with the first electronic device;

compare the tagged rule associated with the message request to the tagged rule associated with the first electronic device wherein the comparing comprises comparing a hash value result for the tagged rule associated with the message request to a hash value result for the tagged rule associated with the first electronic device; and send a response associated with the digital content if the tagged rule associated with the message request and the tagged rule associated with the first electronic device are equivalent a second electronic device configured to:

receive the message request for the digital content from the first electronic device if the tagged rule associated with the message request and the tagged rule associated with the first electronic device are not equivalent;

parse the tagged rule associated with the message request into a set of tree-based hierarchical tagged rules;

retrieve a tagged rule associated with the second electronic device;

compare the parsed tagged rules to the tagged rule associated with the second electronic device; and send the response associated with the digital content.

14. The system of claim 13, wherein the response comprises:

at least one of a content found indicator, the digital content identified by the message request, content related to the digital content identified by the message request, and a blank content message, wherein the blank content message is returned if none of the parsed tagged rules are equivalent to the tagged rule associated with the second electronic device, and wherein a separate response is sent from the second electronic device for each parsed tree-based hierarchical tagged rule.

15. A non-transitory computer-readable storage medium storing computer-executable instructions for retrieving digital content that, when executed on a first computing device, cause the first computing device to:

receive a message request for the digital content;

determine a tagged rule associated with the message request;

retrieve a tagged rule associated with the first computing device;

compare the tagged rule associated with the message request to the tagged rule associated with the first computing device; and send a response associated with the digital content if the tagged rule associated with the message request and the tagged rule associated with the first computing device are equivalent;

receive the message request for the digital content from the first computing device if the tagged rule associated with the message request and the tagged rule associated with the first computing device are not equivalent;

parse the tagged rule associated with the message request into a set of tree-based hierarchical tagged rules;

retrieve a tagged rule associated with the second computing device;

compare the parsed tagged rules to the tagged rule associated with the second computing device; and send the response associated with the digital content.

16. The non-transitory medium of claim 15, wherein the tagged rule associated with the message request and the tagged rule associated with the first computing device comprise a routing rule defined by at least one of a person, a process, an electronic storage system, a date, a time, a session based user unique identifier, a persistent user unique identifier, a frequency of the message request, and a destination device.

17. The non-transitory medium of claim 15, wherein the response comprises:

at least one of a content found indicator, the digital content identified by the message request, content related to the digital content identified by the message request, and a blank content message, wherein the blank content message is returned if none of the parsed tagged rules are equivalent to the tagged rule associated with the second computing, and wherein a separate response is sent from the second computing device for each parsed tree-based hierarchical tagged rule.

* * * * *